United States Patent
Yu et al.

(10) Patent No.: US 10,192,107 B2
(45) Date of Patent: Jan. 29, 2019

(54) OBJECT DETECTION METHOD AND OBJECT DETECTION APPARATUS

(71) Applicants: BEIJING KUANGSHI TECHNOLOGY CO., LTD., Beijing (CN); MEGVII (BEIJING) TECHNOLOGY CO., LTD., Beijing (CN)

(72) Inventors: Gang Yu, Beijing (CN); Chao Li, Beijing (CN); Qizheng He, Beijing (CN); Qi Yin, Beijing (CN)

(73) Assignees: BEIJING KUANGSHI TECHNOLOGY CO., LTD., Beijing (CN); MEGVII (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/922,488

(22) Filed: Mar. 15, 2018

(65) Prior Publication Data

US 2018/0204057 A1 Jul. 19, 2018

Related U.S. Application Data

(63) Continuation of application No. 15/005,620, filed on Jan. 25, 2016, now Pat. No. 9,940,509.

(30) Foreign Application Priority Data

Oct. 10, 2015 (CN) .......................... 2015 1 0654143

(51) Int. Cl.
*G06K 9/00* (2006.01)
*G06K 9/52* (2006.01)
(Continued)

(52) U.S. Cl.
CPC ..... *G06K 9/00369* (2013.01); *G06K 9/00771* (2013.01); *G06K 9/52* (2013.01);
(Continued)

(58) Field of Classification Search
CPC ... F16L 1/26; Y10T 29/4994; G06K 9/00369; G06K 9/00771; G06K 9/52;
(Continued)

(56) References Cited

U.S. PATENT DOCUMENTS

| | | | |
|---|---|---|---|
| 2014/0072170 A1* | 3/2014 | Zhang | G06K 9/00369 382/103 |
| 2015/0131851 A1* | 5/2015 | Bernal | G06K 9/00711 382/103 |

FOREIGN PATENT DOCUMENTS

| | | |
|---|---|---|
| CN | 104504362 | 4/2015 |
| CN | 104835147 | 8/2015 |
| WO | 2009/076182 | 6/2009 |

OTHER PUBLICATIONS

First Chinese Office Action, issued in the corresponding Chinese patent application No. 201510654143.9, dated May 3, 2018, 14 pages.
(Continued)

*Primary Examiner* — Manuchehr Rahmjoo
(74) *Attorney, Agent, or Firm* — Hamre, Schumann, Mueller & Larson, P.C.

(57) ABSTRACT

An object detection method and an object detection apparatus are provided. The object detection method includes: mapping at least one image frame in an image sequence into a three dimensional physical space to obtain three dimensional coordinates of each pixel in the at least one image frame; extracting a foreground region in the at least one image frame; segmenting the foreground region into a set of blobs; and detecting, for each blob in the set of blobs, an object in the blob through a neural network based on the
(Continued)

three dimensional coordinates of at least one predetermined reference point in the blob, to obtain an object detection result.

6 Claims, 3 Drawing Sheets

(51) Int. Cl.
    *G06T 7/174* (2017.01)
    *G06T 7/194* (2017.01)
    *G06T 7/11* (2017.01)
    *G06N 3/04* (2006.01)

(52) U.S. Cl.
    CPC ............... *G06T 7/11* (2017.01); *G06T 7/174* (2017.01); *G06T 7/194* (2017.01); *G06N 3/0445* (2013.01); *G06T 2207/10016* (2013.01); *G06T 2207/20084* (2013.01); *G06T 2207/30196* (2013.01)

(58) Field of Classification Search
    CPC ........ G06N 3/0445; G06T 2207/10016; G06T 2207/20084; G06T 2207/30196; G06T 7/11; G06T 7/174; G06T 7/194
    See application file for complete search history.

(56) References Cited

OTHER PUBLICATIONS

Hu et al., "Learning a Probabilistic Model Mixing 3D and 2D Primitives for View Invariant Object Recognition", Department of Statistics, University of California, USA and Lotus Hill Research Institute, Ezhou, China, pp. 2273-2280, IEEE 2010.

Lu et al., "Improvements of 3D Object Detection with Part-based Models", ACTA Automatica Sinica, vol. 38, No. 4, pp. 497-506, Apr. 2012 (English abstract enclosed).

Hoiem et al., "youtCRF for Multi-View Object Class Recognition and Segmentation", IEEE Conference on Computer Vision and Pattern Recognition, 8 pages, 2007.

* cited by examiner

OBJECT DETECTION METHOD AND OBJECT DETECTION APPARATUS

CROSS-REFERENCE TO RELATED APPLICATION

The present disclosure is a continuation application of U.S. patent application Ser. No. 15/005,620 filed on Jan. 25, 2016, which claims the benefits of and priority of Chinese patent application No. 201510654143.9 filed on Oct. 10, 2015, the disclosure of which is incorporated herein by reference in its entirety.

TECHNICAL FIELD OF THE DISCLOSURE

The present disclosure relates to the filed for object detection, and particularly to an object detection method and an object detection apparatus.

BACKGROUND

With the spread of the monitoring video and the increasing focus on the safety issues, there is an urgent need for an intelligent analysis for a specific object, such as a pedestrian or a vehicle, in the monitoring video data.

Taking the pedestrian detection as an example, in a pedestrian detection method, a video scenario is segmented into blobs and each blob is assumed to include only one pedestrian, and the pedestrian is tracked in unit of blob. The method is effective for a scenario in which the density of the pedestrians is relatively low. However, for a scenario in which there is complicated traffic or the density of the pedestrians is high, each blob may include many pedestrians, therefore, it is difficult for such an algorithm to locate each pedestrian accurately.

In another pedestrian detection method, a pedestrian detection algorithm is performed directly for each frame of the video. However, such a method is complicated and requires a long computation time. Further, for a monitoring scenario in which there is large traffic, since there is a lot of shielding situations in the scenario, it is also difficult to locate each pedestrian in the scenario completely.

SUMMARY

In view of the above, the present disclosure provides an object detection method and an object detection apparatus which enable an accurate object detection even in complicated scenarios with high densities.

Further, the present disclosure provides an object detection method and an object detection apparatus, which enable not only an accurate object detection in the complicated scenarios with high densities, but also an accurate object tracking in subsequent proceedings.

According to an embodiment of the present disclosure, an object detection method is provided, comprising: mapping at least one image frame in an image sequence into a three dimensional physical space, to obtain three dimensional coordinates of each pixel in the at least one image frame; extracting a foreground region in the at least one image frame; segmenting the foreground region into a set of blobs; and detecting, for each blob in the set of blobs, an object in the blob through a neural network based on three dimensional coordinates of at least one predetermined reference point in the blob to obtain an object detection result.

According to another embodiment of the present disclosure, an object detection apparatus is provided, comprising: a three dimensional coordinate obtaining unit operative to map at least one image frame in an image sequence into a three dimensional physical space to obtain three dimensional coordinates of each pixel in the at least one image frame; a foreground extracting unit operative to extract a foreground region in the at least one image frame; a segmenting unit operative to segment the foreground region into a set of blobs; and a detecting unit operative to detect, for each blob in the set of blobs, an object in the blob through a neural network based on the three dimensional coordinates of at least one predetermined reference point in the blob to obtain an object detection result.

According to a further embodiment of the present disclosure, an object detection apparatus is provided, comprising: a processor; a memory; and computer program instructions stored in the memory, wherein the memory and the computer program instructions operative to, working with the processor, cause the object detection apparatus to perform at least the following: mapping at least one image frame in an image sequence into a three dimensional physical space, to obtain three dimensional coordinates of each pixel in the at least one image frame; extracting a foreground region in the at least one image frame; segmenting the foreground region into a set of blobs; and detecting, for each blob in the set of blobs, an object in the blob through a neural network based on the three dimensional coordinates of at least one predetermined reference point in the blob to obtain an object detection result.

According to still a further embodiment of the present disclosure, a computer program product is provided, the computer program product comprises a computer readable storage medium, and computer program instructions stored on the computer readable storage medium, wherein the computer program instructions are executable by an object detection apparatus for causing the object detection apparatus to perform at least the following: mapping at least one image frame in an image sequence into a three dimensional physical space to obtain three dimensional coordinates of each pixel in the at least one image frame; extracting a foreground region in the at least one image frame; segmenting the foreground region into a set of blobs; and detecting, for each blob in the set of blobs, an object in the blob through a neural network based on the three dimensional coordinates of at least one predetermined reference point in the blob to obtain an object detection result.

In the object detection method and the object detection apparatus according to the embodiments of the present disclosure, each individual image frame is segmented into blobs and each of the blob is detected through a neural network, thereby, an object detection can be performed accurately even in the complicated scenarios with the high densities.

DETAILED DESCRIPTION

Hereinafter, the embodiments of the present disclosure will be described in detail with reference to the accompany drawings.

First, the object detection method according to an embodiment of the present disclosure will be described with reference to FIG. 1.

Figure 1:
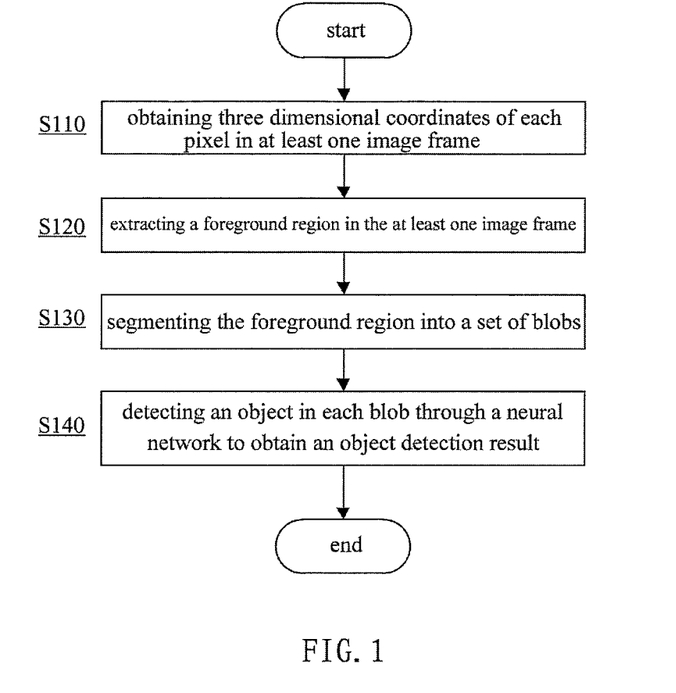
FIG. 1 is a flowchart showing main steps of an object detection method according to an embodiment of the present disclosure.

As shown in FIG. 1, first, at a step S110, at least one image frame in an image sequence is mapped into a three dimensional (3D) physical space, to obtain 3D coordinates of each pixel in the at least one image frame.

The image sequence may be captured by a camera installed in a scenario to be detected. The at least one image frame may be any one or more image frame(s) in the image sequence. Alternatively, when the object is to be tracked after being detected, multiple image frames or even each image frame in the image sequence may be mapped into the 3D physical space.

Regarding the mapping, exemplarily, first, at least three non-collinear pixels on a predetermined reference plane in an image space may be determined. The predetermined reference plane may be a horizontal plane, for example. In the following description, the case of three pixels is described for illustrative purpose. It should be understood that other number of the pixels can also be employed.

Next, deep information of the three pixels may be acquired. The deep information represents a distance from a point in the real world corresponding to a pixel in an image to the camera origin. In one embodiment, the deep information may be obtained by a distance measurement instrument. In another embodiment, the deep information may be manually estimated. In another embodiment, the deep information may be obtained by a depth camera.

After acquiring the deep information of the three pixels, a mapping transformation from the image space to the 3D physical space may be established based on the deep information of the three pixels. More specifically, assuming that the cameral model is a pinhole imaging module, thus, the mapping transformation may be established through the pinhole imaging model and based on the deep information of the three pixels. Thereby, each pixel in the image frame may be mapped into the 3D physical space according to the mapping transformation, and the 3D coordinates of each pixel are obtained. In one embodiment, the location where the camera is located can be regarded as the origin of the 3D coordinates.

Next, the object detection method proceeds to a step S120, where a foreground region in the at least one image frame is extracted.

Particularly, first, a background model may be determined by various methods, such as a pixel-based method, a method based on color model, a frame-based subspace method, or the like. Then, a region which is different from the background model is extracted from the image frame and is regarded as the foreground region. It should be understood that the method of extracting the foreground region as described above is only an example. Those skilled in the art may extract the foreground region from the image frame in various other ways.

Additionally, in order to make the object detection result more accurate, a shadow removing process may be performed on the image frame. That is, the shadow part in the foreground region is removed through a shadow detection algorithm. Particularly, for example, considering that the brightness of the light in the shadow section is always darker than that of the non-shadow section, and considering that the shadow section always keeps the texture information of the ground itself, therefore, by employing various shadow detection algorithm known in the art or possibly to be developed in the future, the shadow section may be found based on various information such as the brightness information, the texture information, or the like, and then the shadow section is removed from the foreground region.

Then, at a step S130, the foreground region is segmented into a set of blobs which are unconnected with each other. Particularly, the foreground region may be segmented in various segmentation ways known in the image processing field and possibly to be developed in the future, which will not be described in detail herein. In one embodiment, each blob may include at least one object.

After obtaining the set of blobs including the individual blobs through the segmenting process, at a step S140, for each blob in the set of blobs, an object in the blob is detected through a neural network based on the 3D coordinates of at least one predetermined reference point in the blob to obtain an object detection result.

Particularly, in one embodiment, the at least one predetermined reference point in the blob includes at least one pixel in contact with the predetermined reference plane in the blob. A physical dimension of the blob in a real scenario, e.g., in the 3D physical space, may be estimated based on the 3D coordinates of the at least one pixel in contact with the predetermined reference plane in the blob and based on the size information of the blob in the image frame. More particularly, here, it may be assumed that all the objects in the same blob have the same or similar deep information. Therefore, the size information of the blob in the image frame, such as the width of the blob, is determined based on the coordinates of the at least one pixel in contact with the predetermined reference plane, such as the horizontal plane, in the blob. Furthermore, the physical dimension, such as the width and the height, of the blob in the real scenario, e.g., in the 3D physical space, is calculated based on the width and the length of the blob in the image frame. More particularly, the physical dimension of the real scenario corresponding to the image frame may be obtained in advance, and the physical dimension of the blob is calculated based on the size of the blob in the image frame and the physical dimension of the real scenario obtained in advance.

Then, an upper limit of the number of the objects which can exist in the blob may be calculated based on the physical dimension of the blob. For example, for a specific object, a physical dimension, such as the width, of the object may be set in advance. Therefore, the upper limit of the number of the objects which can exist in the blob may be calculated based on the physical dimension of the object and the physical dimension of the blob. Further, a density of the objects in the blob may be preset, and the upper limit is estimated with reference to the preset density. Exemplarily, it may be assumed that the objects are throughout the blob, and the overlapping ratio of the objects in the blob is 120%, 130%, or the like. Then, the objects in the blob are detected through the neural network based on the blob and the upper limit to obtain the object detection result.

More particularly, the neural network may be various kinds of neural networks, for example, the recurrent neural network (RNN). The recurrent neural network may adopt various structures which are not limited herein. Multiple detection processes may be performed through the neural network. For a detection process, the blob and the upper limit are input to the neural network which is a trained neural network to obtain a location of a first object in the blob, and a confidence indicating a probability that the first object exists at the location. In one embodiment, for multiple detection processes, the confidences obtained in the respective detection processes may be arranged in a specific order, such as a descending order.

Then, it is determined whether an ending condition is satisfied or not. In an embodiment, it may be determined whether the number of detected objects reaches the upper limit or not. In another embodiment, it may be determined whether the confidence obtained in the current detecting process is lower than a threshold or not when the confidences are arranged in the descending order. It should be understood that the above ending conditions are only exemplary. Those skilled in the art may design various other ending conditions may be employed.

The recurrent neural network continues to perform a next detecting process for detecting a second object in the blob when it is determined that the ending condition has not been satisfied. The recurrent neural network continues to perform the detecting process for detecting the following objects in the blob until the ending condition is satisfied. For example, when the ending condition is determined based on the upper limit, if the upper limit is N (N is an integer), then the recurrent neural network can perform the detection process N times. When the ending condition is satisfied, the locations of the objects and corresponding confidences obtained through respective detecting processes are output as the object detection result.

The process of detecting the object in the blob through the neural network has been described above. In terms of the training of the neural network, multiple training data including positive samples (i.e., data including objects) and negative samples (i.e., data without objects) may be input to the neural network in advance. Each training data may include image and image information, such as the location of the object in the image or the like. Then, the samples with the ground-truth may be matched with the samples with the prediction result through various algorithms, such as the Hungarian Algorithm, or the like so as to train the neural network. Alternatively, after the matching, the loss of the prediction result may be calculated based on the matching accuracy and the possibility of the dimension of the output result in the 3D physical scenario.

It should be noted that the above description is only one training method of the neural network. Those skilled in the art may understand that the neural network may be trained in various other ways which are not limited here.

The object detection method according to the embodiment of the present disclosure has been described above with reference to FIG. 1. In the object detection method according to the embodiment of the present disclosure, each individual image frame is segmented into blobs, and each of the blobs is detected through the neural network, therefore, the object detection can be performed accurately even in complicated high density scenarios, and the accuracy of the object detection is improved largely.

Further, the object detection method according to the embodiment of the present disclosure may be applied in various fields, and may be applied effectively to various smart monitoring scenarios and fields by an one-off simple configuration, so that the labor force is saved effectively, and an analysis as well as an alarm about the safety issue, such as the density being over high in the monitoring scenarios, may be given accurately in real time.

It should be noted that in the above description, the object detection method according to an embodiment of the present disclosure may be described with reference to a pedestrian detection as an example. However, those skilled in the art may understand that the object detection method according to the embodiment of the present disclosure is not limited thereto, and the object detection method may be applied appropriately to the detection of various other objects, such as the vehicles, or the like.

Figure 2:
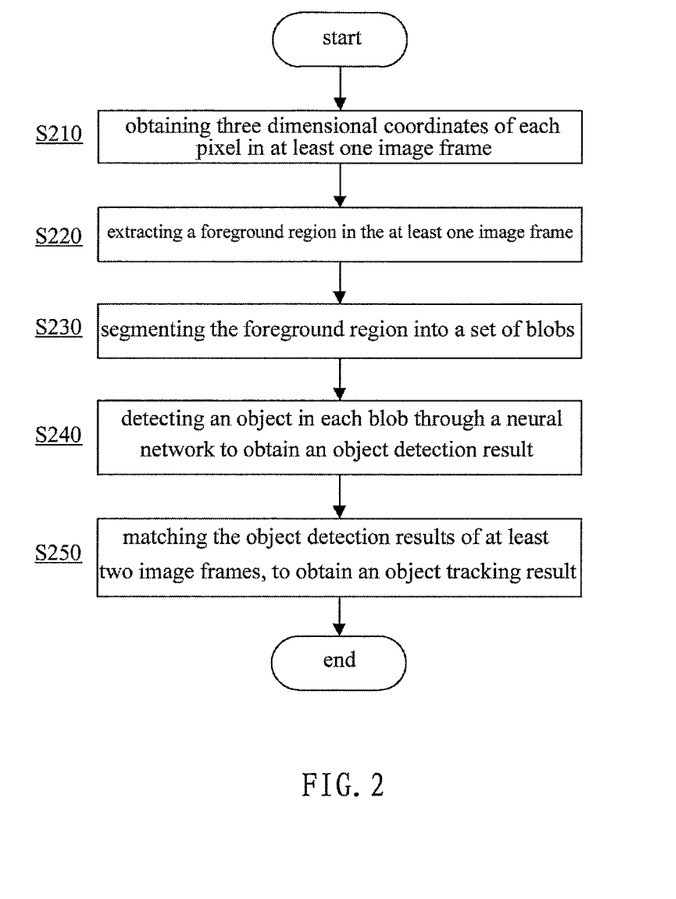
FIG. 2 is a flowchart showing main steps of an object detection method according to another embodiment of the present disclosure.

Further, the object detection method according to the embodiment of the present disclosure may also be applied to the object tracking. That is, the object detection method according to the embodiment of the present disclosure may be implemented as an object tracking method. FIG. 2 is a flowchart showing main steps of the object detection method in this embodiment.

The processes in Steps S210-S240 of FIG. 2 are similar to those in Steps S110-S140 of FIG. 1 respectively, and are not repeated here. Different from FIG. 1, in FIG. 2, after obtaining the object detection result, at step S250, the object detection results of at least two image frames are matched to obtain an object tracking result. In one embodiment, in Steps S210-S240, at least two image frames are detected for object detection, and the at least two image frames in Step S250 is a subset of the detected images frames in Steps S210-S240.

Particularly, the at least two image frames may be any two image frames in the image sequence. In one embodiment, in order to make the object tracking result more accurate, the at least two image frames are two image frames adjacent to each other in time-sequence of the image sequence. For example, the at least two image frames may be two adjacent image frames in the image sequence.

More particularly, feature information of each object detected in each image frame in the at least two image frames may be extracted. The feature information comprises at least one of location information, appearance information and texture information of the object, for example. The appearance information is, for example, color information of the object, such as a RGB or HSV histogram, a directional gradient histogram, or the like. The texture information is, for example, a local binary pattern, or the like.

Next, for each object in an image frame of the at least two image frames multiple weights are assigned to multiple links between the object and each object in other image frames of the at least two image frames respectively based on the feature information, and each of the weights indicates a probability of the object being matched with each object in the other image frames. For example, for each object in the current frame, the weights are assigned to multiple links between the object and each object in the next image frame based on the feature information. Each of the weights indicates the probability of the object being matched with each object in the next image frame.

In one embodiment, the weights of the links between the object and each object in the next image frame may be calculated based on the feature information in various ways, such as the Support Vector Machine, the Random Forest, the Convolutional Neural Network (CNN), or the like.

In another embodiment, Euclidean distances between the object and each object in the next image frame may be calculated by various ways, such as the Support Vector Machine, the Random Forest, the CNN, or the like. Then, the weights are assigned to the links between the object and each object in the next image frame respectively based on the Euclidean distances. The smaller the Euclidean distance is, the higher the similarity between the two objects in the link is, and the larger the weight assigned to the link is. The larger the Euclidean distance is, the lower the similarity between the two objects in the link is, and the smaller the weight assigned to the link is.

It should be understood that, the two embodiments described above are only examples. Those skilled in the art may design other ways to calculate the weights without departing from the scope of the disclosure.

Then, the at least two image frames in the image sequence are matched based on the weights to obtain the object tracking result. Particularly, the at least two image frames may be matched through various algorithms, such as the Hungarian Algorithm, the particle filter, the Kalman filter, or the like.

The application of the object detection method according to the embodiment of the present disclosure in the object tracking scenario has been described above. In the object detection method according to the embodiment of the present disclosure, each image frame is segmented into blobs, each blob is detected through the neural network, and the object detection results between at least two image frames are matched to obtain the object tracking result, so that the object detection and tracking may be performed accurately even in complicated scenarios with high densities.

Hereinafter, the object detection apparatus according to the embodiment of the present disclosure will be described with reference to FIG. 3.

Figure 3:
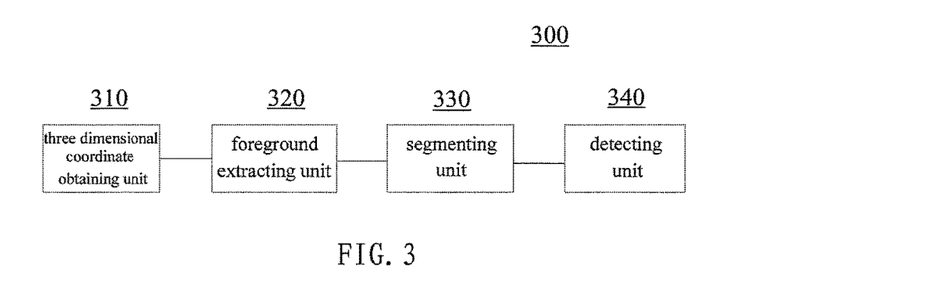
FIG. 3 is a block diagram showing a main configuration of an object detection apparatus according to an embodiment of the present disclosure.

FIG. 3 is a block diagram illustrating a main configuration of the object detection apparatus according to an embodiment of the present disclosure. As shown in FIG. 3, the object detection apparatus 300 according to the embodiment of the present disclosure comprises a 3D coordinate obtaining unit 310, a foreground extracting unit 320, a segmenting unit 330 and a detecting unit 340.

Particularly, the 3D coordinate obtaining unit 310 is operative to map at least one image frame in an image sequence into a 3D physical space, to obtain 3D coordinates of each pixel in the at least one image frame. The foreground extracting unit 320 is operative to extract a foreground region in the at least one image frame. The segmenting unit 330 is operative to segment the foreground region into a set of blobs. The detecting unit 340 is operative to detect, for each blob in the set of blobs, an object in the blob through a neural network based on the 3D coordinates of at least one predetermined reference point in the blob to obtain an object detection result.

In another embodiment, the predetermined reference point in the blob includes at least one pixel in contact with a predetermined reference plane in the blob, and the detecting unit 340 comprises a physical dimension estimating unit operative to estimate a physical dimension of the blob in the three dimension physical space, e.g. the real scenario, based on the 3D coordinates of the at least one pixel in contact with the predetermined reference plane in the blob and also based on the size information of the blob in the image frame; an upper limit calculating unit operative to calculate an upper limit of the number of the objects which can exist in the blob based on the physical dimension of the blob; and a detection result obtaining unit operative to detect the object in the blob through the neural network based on the blob and the upper limit to obtain the object detection result.

In a further embodiment, the detection result obtaining unit comprises an executing unit operative to input the blob and the upper limit to the neural network which is a trained neural network during a detecting process to obtain a location of a first object corresponding to the detection process in the blob and a confidence indicating a probability that the first object exists at the location; a determining unit operative to determine whether an ending condition is satisfied or not; and the executing unit is operative to perform a next detecting process for detecting a second object when it is determined that the ending condition has not been satisfied, and to output the locations of the detected objects and corresponding confidences obtained through respective detecting processes as the object detection result when it is determined that the ending condition is satisfied.

In still a further embodiment, the determining unit is operative to perform at least one step of: determining whether the number of objects that have been detected in the blob reaches the upper limit or not; and determining whether the confidence obtained in the current detecting process is lower than a threshold or not.

In still a further embodiment, the 3D coordinate obtaining unit comprises: a pixel determining unit operative to determine at least three non-collinear pixels on a predetermined reference plane in an image space; a deep information acquiring unit operative to acquire deep information of the at least three pixels; a mapping transformation establishing unit operative to establish a mapping transformation from the image space to a three dimensional physical space based on the deep information of the at least three pixels; and a mapping unit operative to map each pixel in the frame image to the 3D physical space through the mapping transformation to obtain the 3D coordinates of each pixel in the image frame.

The configurations and operations of the individual units of the object detection apparatus have been described in detail in the object detection method with reference to FIG. 1, and will not be described in detail further.

Figure 4:
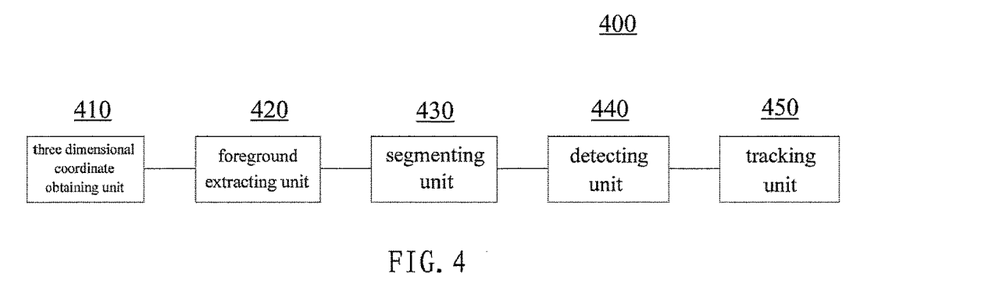
FIG. 4 is a block diagram showing a main configuration of an object detection apparatus according to another embodiment of the present disclosure.

Further, the object detection apparatus according to the embodiment of the present disclosure may also be applied to the object tracking. That is, the object detection apparatus according to the embodiment of the present disclosure may also be implemented as an object tracking apparatus. FIG. 4 is a block diagram illustrating a main configuration of the object detection apparatus according to the embodiment.

As shown in FIG. 4, the object detection apparatus 400 according to the embodiment of the present disclosure comprises a 3D coordinate obtaining unit 410, a foreground extracting unit 420, a segmenting unit 430, a detecting unit 440 and a tracking unit 450.

The configurations and operations of the 3D coordinate obtaining unit 410, the foreground extracting unit 420, the segmenting unit 430 and the detecting unit 440 are similar to those in the object detection apparatus 300 as shown in FIG. 3, and will not be described here in detail.

Different from that in FIG. 3, the object detection apparatus 400 according to the embodiment of the present disclosure further comprises the tracking unit 450, which is operative to match the object detection results of at least two image frames to obtain an object tracking result.

Particularly, the tracking unit may comprises: a feature extracting unit operative to extract feature information of each object detected in each image frame in the at least two image frames, wherein the feature information includes at least one of location information, appearance information and texture information of the object; a weight assigning unit operative to assign, for each object in an image frame of the at least two image frames, multiple weights to multiple links between the object and each object in other image frames of the at least two image frames, respectively, based on the feature information, wherein each of the weights indicates a probability of the object being matched with each object in the other image frames; and a matching unit operative to match the at least two image frames in the image sequence based on the weights to obtain the object tracking result.

Figure 5:
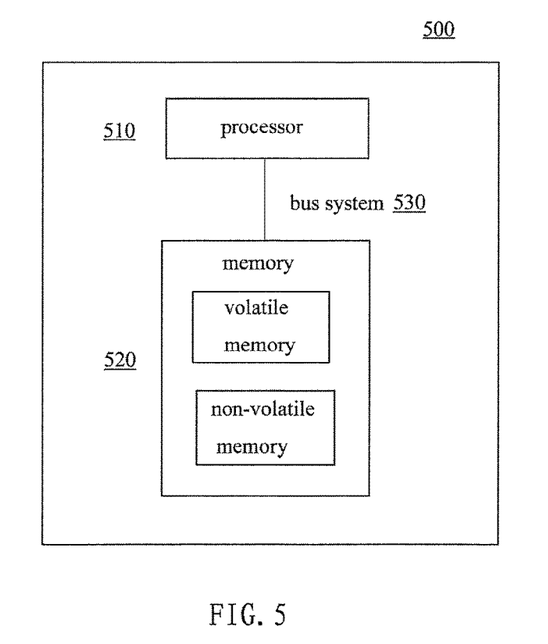
FIG. 5 is a block diagram showing a main configuration of an object detection apparatus according to a further embodiment of the present disclosure.

FIG. 5 is a block diagram illustrating a main configuration of an object detection apparatus according to another embodiment of the present disclosure.

As shown in FIG. 5, the object detection apparatus 500 according to the embodiment of the present disclosure mainly includes one or more processor(s) 510 and one or more memory (memories) 520. These components are interconnected with each other through a bus system 530 and/or a connection mechanism in other forms (not shown). It should be noted that the components and the structure of the object detection apparatus 500 as shown in FIG. 5 are only exemplary but not limited, and the object detection apparatus 500 may comprise other components with other structures when necessary.

The processor 510 may be a Central Processing Unit (CPU) or a processing unit in other forms having a data processing capability and/or an instruction execution capability, and may control other components in the object detection apparatus 500 to perform a desired function.

The memory 520 may include computer readable storage media in various forms, for example, a volatile memory and/or a non-volatile memory. The volatile memory may, for example, include a Random Access Memory (RAM) and/or a cache memory (cache) or the like. The non-volatile memory may, for example, include a Read Only Memory (ROM), a hard disk, a flash memory or the like. There may be one or more computer program instructions stored on the computer readable storage media, which may be executed by the processor 510 so as to cause the object detection apparatus 500 to implement respective functions and/or other desired functions of the object detection method of the embodiment of the present disclosure as described herein.

In particularly, the computer program instructions, when read by the processor 510, causes the object detection apparatus 500 to perform at least the following: mapping at least one image frame in an image sequence into a three dimensional physical space, to obtain three dimensional coordinates of each pixel in the at least one image frame; extracting a foreground region in the at least one image frame; segmenting the foreground region into a set of blobs; and detecting, for each blob in the set of blobs, an object in the blob through a neural network based on the three dimensional coordinates of at least one predetermined reference point in the blob to obtain an object detection result.

Further, the computer program instructions is operative to, when read by the processor, cause the object detection apparatus to further perform the step of matching the object detection results of at least two of image frames to obtain an object tracking result.

Further, the predetermined reference point in the blob includes at least one pixel in contact with a predetermined reference plane in the blob, and the step of detecting, for each blob in the set of blobs, an object in the blob through a neural network based on the three dimensional coordinates of at least one predetermined reference point in the blob to obtain an object detection result, performed by the object detection apparatus caused by the computer program instructions read by the processor, comprises: estimating a physical dimension of the blob in the three dimensional physical space based on the three dimensional coordinates of the at least one pixel in contact with the predetermined reference plane in the blob and the size information of the blob in the image frame; calculating an upper limit of the number of the objects which can exist in the blob based on the physical dimension of the blob; and detecting the object in the blob through the neural network based on the blob and the upper limit to obtain the object detection result.

Further, the step of detecting the object in the blob through the neural network based on the blob and the upper limit to obtain the object detection result, performed by the object detection apparatus, caused by the computer program instruction read by the processor, comprises: inputting the blob and the upper limit to a trained neural network during a detecting process to obtain a location of a first object corresponding to the detection process in the blob and a confidence indicating a probability that the first object exists at the location; determining whether an ending condition is satisfied or not; performing a next detecting process for detecting a second object in the blob when it is determined that the ending condition has not been satisfied; and outputting the locations and corresponding confidences obtained through respective detecting processes as the object detection result when it is determined that the ending condition is satisfied.

Further, the step of determining whether the ending condition is satisfied or not, performed by the object detection apparatus caused by the computer program instructions read by the processor, comprises at least one of: determining whether the number of objects that have been detected in the blob reaches the upper limit or not; and determining whether the confidence obtained in the corresponding detecting process is lower than a threshold or not.

Further, the step of matching the object detection results of at least two image frames, performed by the object detection apparatus caused by the computer program instructions read by the processor, comprises: extracting feature information of each object detected in each image frame of the at least two image frames, wherein the feature information comprises at least one of location information, appearance information, and texture information of the object; for each object in an image frame of the at least two image frames, assigning a plurality of weights to a plurality of links between the object and each object in other image frames of the at least two image frames respectively based on the feature information, wherein each of the weights indicates a probability of the object being matched with each object in the other image frames; and matching the at least two image frames in the image sequence based on the weights to obtain the object tracking result.

Further, the step of obtaining the three dimensional coordinates of each pixel in the image frame, performed by the object detection apparatus caused by the computer program instructions read by the processor, comprises: determining at least three non-collinear pixels on a predetermined reference plane in an image space; acquiring deep information of the at least three pixels; establishing a mapping transformation from the image space to the three dimensional physical space, based on the deep information of the at least three pixels; and mapping each pixel in the image frame to the three dimensional physical space through the mapping transformation to obtain the three dimensional coordinates of each pixel in the image frame.

The object detection apparatuses according to the embodiment of the present disclosure have been described above with reference to FIGS. 3-5. In the object detection apparatuses according to the embodiment of the present disclosure, each image frame is segmented into blobs, and each of the blobs in the image frame is detected through the neural network, therefore, the object detection can be performed accurately even in complicated high density scenarios, and the accuracy of the object detection is improved largely.

Further, a computer program product is provided according to an embodiment of the present disclosure, which includes a computer readable medium having stored thereon computer program instructions, wherein the computer program instructions are executable by an object detection apparatus for causing the object detection apparatus to perform individual steps of the object detection method as described above. For example, the computer program instructions, when executed by the computer, may cause the object detection apparatus to perform at least the following: mapping at least one image frame in an image sequence into a 3D physical space to obtain 3D coordinates of each pixel in the at least one image frame; extracting a foreground region in the at least one image frame; segmenting the foreground region into a set of blobs; and detecting, for each blob in the set of blobs, an object in the blob through a neural network based on the 3D coordinates of at least one predetermined reference point in the blob to obtain an object detection result.

The object detection method and the object detection apparatus according to the embodiments of the present disclosure have been described above with reference to FIGS. 1-5.

It is to be noted that in the specification, the terms comprising, containing or any other variation are intended to cover non-exhaustively inclusion, so that a process, a method, a product or a device comprising a series of elements not only include those elements, but may also include other elements not listed explicitly, or include elements inherent to the process, the method, the product or the device. Without any other limitation, an element limited by the expression "comprising a" does not exclude there being additional identical elements included in the process, the method, the product or the device comprising the element.

Further, it is to be noted that in the specification, the expressions similar to a first . . . unit, a second . . . unit are only for convenience to distinguish, and do not mean that they must be implemented as two or more units physically separated. In fact, the units may be implemented as one single unit integrally, or multiple units as necessary.

Finally, it is to be noted that the above-described series of process not only include the processes performed in a time order, but may also include processes in parallel or individually other than in the time order.

From the description of the embodiments, those skilled in the art may understand clearly that the present disclosure may be implemented by software in combination with necessary hardware platform, and of course the present disclosure may also be fully implemented by hardware. Base on such understanding, the part of the technical solution of the invention which is contribute to the prior art may be embodied in whole or in part in the form of a software product. This computer software product can be stored in a storage medium, such as a ROM/RAM, a disk, an optical disc and the like, and include many instructions to cause one computer device (may be personal computer, server or network device etc.) to implement the embodiments of the invention or method describe by some parts of the embodiment.

In the embodiment of the present disclosure, the module may be realized by software so as to be executed by various processors. For example, an identified executable code module may comprise one or more physical or logical blocks of the computer instructions, which may, for example, be constructed as an object, a process or a function. Nevertheless, the executable codes of the identified module are not necessary to be located together physically, and may comprise different instructions stored at different locations, which may construct a module and achieve the predetermined purpose of the module when being combined together logically.

When the module is realized by software, considering the existing hardware manufacture process, those skilled in the art may realize its function by corresponding hardware circuits comprising the normal VLSI circuit or the existing semiconductor such as a logical chip or a transistor, or other separate elements, regardless of cost. The module may also be realized by a programmable hardware device, such as a field programmable gate array, a programmable array logic, or a programmable logical device, etc.

The above is only embodiments of the present disclosure. It should be noted that various modifications and alternations may be made by those of ordinary skill in the art without departing from the principle of the present disclosure, which should also be viewed as falling within the protection scope of the present disclosure.

What is claimed is:

1. An object detection method comprising:
   mapping at least one image frame in an image sequence into a three dimensional physical space, to obtain three dimensional coordinates of each pixel in the at least one image frame;
   extracting a foreground region in the at least one image frame;
   segmenting the foreground region into a set of blobs;
   detecting, for each blob in the set of blobs, an object in the blob through a neural network based on the three dimensional coordinates of at least one predetermined reference point in the blob to obtain an object detection result; and
   matching the object detection results of at least two image frames to obtain an object tracking result;
   wherein matching of the object detection results of the at least two image frames comprises:
   extracting feature information of each object detected in each image frame of the at least two image frames, wherein the feature information comprises at least one of location information, appearance information, and texture information of the object;
   for each object in an image frame of the at least two image frames, assigning a plurality of weights to a plurality of links between the object and each object in other image frames of the at least two image frames respectively based on the feature information, wherein each of the weights indicates a probability of the object being matched with each object in the other image frames; and
   matching the at least two image frames in the image sequence based on the weights to obtain the object tracking result;
   calculating Euclidean distances between the object and each object in other image frames of the at least two image frames; and
   assigning the weights to the links between the object and each object in other image frames of the at least two image frames respectively based on the Euclidean distances;
   wherein the smaller the Euclidean distance is, the larger the weight assigned to the link is.

2. The object detection method of claim 1, wherein obtaining of the three dimensional coordinates of each pixel in the image frame comprises:
   determining at least three non-collinear pixels on a predetermined reference plane in an image space;

acquiring deep information of the at least three pixels;
establishing a mapping transformation from the image space to the three dimensional physical space based on the deep information of the at least three pixels; and
mapping each pixel in the image frame to the three dimensional physical space through the mapping transformation to obtain the three dimensional coordinates of each pixel in the image frame.

3. An object detection apparatus comprising:
a three dimensional coordinate obtaining unit operative to map at least one image frame in an image sequence into a three dimensional physical space, to obtain three dimensional coordinates of each pixel in the at least one image frame;
a foreground extracting unit operative to extract a foreground region in the at least one image frame;
a segmenting unit operative to segment the foreground region into a set of blobs;
a detecting unit operative to detect, for each blob in the set of blobs, an object in the blob through a neural network based on the three dimensional coordinates of at least one predetermined reference point in the blob to obtain an object detection result; and
a tracking unit operative to match the object detection results of at least two image frames to obtain an object tracking result;
wherein the tracking unit comprises:
a feature extracting unit operative to extract feature information of each object detected in each image frame of the at least two image frames, wherein the feature information comprises at least one of location information, appearance information, and texture information of the object;
a weight assigning unit operative to assign, for each object in an image frame of the at least two image frames, a plurality of weights to a plurality of links between the object and each object in other image frames of the at least two image frames respectively based on the feature information, and wherein each of the weights indicates a probability of the object being matched with each object in the other image frames; and
a matching unit operative to match the at least two image frames in the image sequence based on the weights to obtain the object tracking result;
the weight assigning unit operative to calculate Euclidean distances between the object and each object in other image frames of the at least two image frames, and assign the weights to the links between the object and each object in other image frames of the at least two image frames respectively based on the Euclidean distances, during assigning the plurality of weights to the plurality of links between the object and each object in other image frames of the at least two image frames;
the smaller the Euclidean distance is, the larger the weight assigned to the link is.

4. The object detection apparatus of claim 3, wherein the three dimensional coordinate obtaining unit comprises:
a pixel determining unit operative to determine at least three non-collinear pixels on a predetermined reference plane in an image space;
a deep information acquiring unit operative to acquire deep information of the at least three pixels;
a mapping transformation establishing unit operative to establish a mapping transformation from the image space to the three dimensional physical space based on the deep information of the at least three pixels; and
a mapping unit operative to map each pixel in the image frame to the three dimensional physical space through the mapping transformation to obtain the three dimensional coordinates of each pixel in the image frame.

5. An object detection apparatus comprising:
a processor;
a memory comprising computer program instruction, wherein the computer program instructions operative to, when read by the processor, cause the object detection apparatus to perform at least the following:
mapping at least one image frame in an image sequence into a three dimensional physical space, to obtain three dimensional coordinates of each pixel in the at least one image frame;
extracting a foreground region in the at least one image frame;
segmenting the foreground region into a set of blobs;
detecting, for each blob in the set of blobs, an object in the blob through a neural network based on the three dimensional coordinates of at least one predetermined reference point in the blob to obtain an object detection result; and
matching the object detection results of at least two image frames to obtain an object tracking result;
wherein matching of the object detection results of the at least two image frames, performed by the object detection apparatus caused by the computer program instructions read by the processor, comprises:
extracting feature information of each object detected in each image frame of the at least two image frames, wherein the feature information comprises at least one of location information, appearance information, and texture information of the object;
for each object in an image frame of the at least two image frames, assigning a plurality of weights to a plurality of links between the object and each object in other image frames of the at least two image frames respectively based on the feature information, wherein each of the weights indicates a probability of the object being matched with each object in the other image frames; and
matching the at least two image frames in the image sequence based on the weights to obtain the object tracking result;
calculating Euclidean distances between the object and each object in other image frames of the at least two image frames; and
assigning the weights to the links between the object and each object in other image frames of the at least two image frames respectively based on the Euclidean distances;
wherein the smaller the Euclidean distance is, the larger the weight assigned to the link is.

6. The object detection apparatus of claim 5, wherein obtaining of the three dimensional coordinates of each pixel in the image frame, performed by the object detection apparatus caused by the computer program instructions read by the processor, comprises:
determining at least three non-collinear pixels on a predetermined reference plane in an image space;
acquiring deep information of the at least three pixels;
establishing a mapping transformation from the image space to the three dimensional physical space, based on the deep information of the at least three pixels; and
mapping each pixel in the image frame to the three dimensional physical space through the mapping transformation to obtain the three dimensional coordinates of each pixel in the image frame.

* * * * *